(12) United States Patent
Miyamura et al.

(10) Patent No.: US 8,787,203 B2
(45) Date of Patent: Jul. 22, 2014

(54) VIRTUAL NETWORK CONTROL METHOD AND SYSTEM BASED ON FLUCTUATIONS

(75) Inventors: Takashi Miyamura, Tokyo (JP); Kohei Shiomoto, Tokyo (JP); Yuki Koizumi, Osaka (JP); Masayuki Murata, Osaka (JP); Shinichi Arakawa, Osaka (JP)

(73) Assignees: Nippon Telegraph and Telephone Corporation (JP); Osaka University (JP)

( * ) Notice: Subject to any disclaimer, the term of this patent is extended or adjusted under 35 U.S.C. 154(b) by 19 days.

(21) Appl. No.: 13/575,055

(22) PCT Filed: Jan. 27, 2011

(86) PCT No.: PCT/JP2011/051643
§ 371 (c)(1),
(2), (4) Date: Jul. 25, 2012

(87) PCT Pub. No.: WO2011/093396
PCT Pub. Date: Aug. 4, 2011

(65) Prior Publication Data
US 2012/0294617 A1    Nov. 22, 2012

(30) Foreign Application Priority Data

Jan. 27, 2010  (JP) ................ 2010-015934
Jan. 27, 2010  (JP) ................ 2010-015936
Jan. 27, 2010  (JP) ................ 2010-015939

(51) Int. Cl.
*H04L 12/28* (2006.01)
*H04L 12/24* (2006.01)
*H04L 12/56* (2006.01)

(52) U.S. Cl.
CPC .............. *H04L 41/12* (2013.01); *H04L 45/48* (2013.01)
USPC ............................ 370/254; 370/256; 370/258

(58) Field of Classification Search
CPC .......... H04L 41/16; H04L 41/02; H04L 41/12
USPC .................. 370/255, 254, 400, 256, 257, 258
See application file for complete search history.

(56) References Cited

U.S. PATENT DOCUMENTS 6,442,615 B1 *   8/2002  Nordenstam et al. ......... 709/241
6,789,090 B1 *   9/2004  Miyake et al. ................. 709/223
2003/0179716 A1  9/2003  Liu

FOREIGN PATENT DOCUMENTS

CN        1741498 A    3/2006
CN     101019382 A    8/2007
(Continued)

OTHER PUBLICATIONS

Office Action, Japanese Patent Application No. JP2010-015936, mailed Jun. 4, 2013.
(Continued)

*Primary Examiner* — Brenda H Pham
(74) *Attorney, Agent, or Firm* — Kilpatrick Townsend & Stockton LLP

(57) ABSTRACT

A virtual network control method, for adaptively controlling a topology of a virtual network formed on a physical network in response to environmental changes in the virtual network, is provided with: a step of storing the Langevin equation, as a fluctuation equation, which models the dynamics of the topology of the virtual network as a variable for controlling the number of wavelength paths on the physical network; a step of designing control parameters included in the fluctuation equation; and a step of controlling the topology of the virtual network by applying the control parameters to the fluctuation equation to change an order parameter included in the fluctuation equation when environmental changes occur in the virtual network, and by transitioning the solution of the fluctuation equation between attractors determined by the deterministic term of the fluctuation equation due to the fluctuation term of the fluctuation equation.

16 Claims, 7 Drawing Sheets

(56) References Cited

FOREIGN PATENT DOCUMENTS

| JP | 2005-6294 A | 1/2005 |
|---|---|---|
| JP | 2011-155507 | 8/2011 |
| JP | 2011-155509 | 8/2011 |

OTHER PUBLICATIONS

International Search Report and Written Opinion, PCT International Application No. PCT/JP2011/051643, mailed Apr. 26, 2011.
Mukherjee et al., "Some Principles for Designing a Wide-Area WDM Optical Network", IEEE/ACM Transactions on Networking. vol. 4, No. 5, pp. 684-696, 1996.
Ramaswami et al., "Design of Logical Topologies for Wavelength-Routed Optical Networks", IEEE Journal on Selected Areas in Communication, vol. 14, pp. 840-851, Jun. 1996.
Ramamurthy et al., "Virtual Topology Reconfiguration of Wavelength-Routed Optical WDM Networks", Proceedings of GLOBECOM, vol. 2, pp. 1269-1275. Nov. 2000.
Koizumi et al., "Adaptability of Virtual Network Topology Control Based on Attractor Selection", IEICE Technical Report, PN2009-21-PN2009-28, Oct. 1, 2009, pp. 47-52 (With English language abstract).
Oshita, et al., "Design of Dynamic Topology Control Server for Optimization of Resource Allocation in Virtualized Network", IEICE Techical Report, PN2008-84 ~ 103, Mar. 2, 2008, pp. 93-98 (With English language abstract).
Koizumi, et al., "Cooperation Among Multiple Virtual Topologies Based on Attractor Superimposition", IEICE Technical Report, PN2010-12-PN2010-22, Aug. 26, 2010, pp. 7-12 (With English language abstract).
Koizumi, et al., "Adaptive Virtual Network Topology Control Based on Attractor Selection", IEEE/OSA Journal of Lightwave Technology, vol. 28, pp. 1720-1731, Jun. 2010.
Koizumi et al., "Cooperation Among Multiple Virtual Topologies Based on Attractor Superimposition", Proceedings of 14th Conference on Optical Network Design and Modeling (ONDM 2010), Feb. 2010.
Koizumi et al., "Robust Virtual Network Topology Control Based on Attractor Selection", Proceedings of 13th Conference on Optical Network Design and Modeling (ONDM 2009), Braunschweig, Germany, Feb. 2009.
Koizumi et al., "Application of Attractor Selection to Adaptive Virtual Network Topology Control", Proceedings of 3rd International Conference on Bio-Inspired Models of Network, Information, and Computing Systems, Bionetics 2008, Hyogo, Japan, Nov. 2008.
Supplementary European Search Report, European Patent Application No. 11737107.0, mailed Jul. 5, 2013.
Office Action, Chinese Patent Application No. 201180007353.9, mailed Apr. 4, 2014.
Minami et al., "Adaptability of Virtual Network Topology Control Based on Attractor Selection", IEICE Technical Report.

* cited by examiner

VIRTUAL NETWORK CONTROL METHOD AND SYSTEM BASED ON FLUCTUATIONS

This application is a national stage application of PCT/JP2011/051643, which claims priority to JP 2010-015939, JP 2010-015936, JP 2010-015934, all filed Jan. 27, 2010, and all of which are incorporated herein by reference.

TECHNICAL FIELD

The present invention relates to a virtual network control method and a virtual network control device for controlling virtual networks such as IP (Internet Protocol), Ethernet (trade mark) and P2P (Peer-to-Peer).

BACKGROUND ARTS

A physical network based on Wavelength Division Multiplexing (WDM), which consists of wavelength paths and OXCs (optical cross-connects), provides wavelength paths connecting nodes in an upper layer to construct a virtual network topology (virtual network) by using wavelength-routing capabilities, thereby providing a flexible communication network infrastructure for realizing various services. As wavelengths for the physical network are bottleneck resources, they have to be utilized effectively. Therefore, to accommodate traffic on a wavelength-routed network effectively, there have been attempted a number of researches about virtual network controls for constructing a virtual network in response to traffic appropriately (see non-patent documents Nos. 1 and 2).

A virtual network is a logical network of an upper layer accommodated on a wavelength network. If the upper layer is an IP, the virtual network topology corresponds to a construction of logical connections. A communication infrastructure installation in itself belongs to a physical network. A virtual network is built up by dividing resources of this physical network logically and allocating a part of the resources to the virtual network. In general, a physical network has a capability of accommodating one or more virtual networks.

For a given traffic demand matrix, non-patent document Nos. 1 and 2 propose an optimization-based method and a heuristic method for designing an optimum virtual network to accommodate its traffic. A traffic demand matrix is a matrix representing a traffic demand between any two nodes in a network, thereby expressing a cross traffic of the whole network.

Recent developments in internet technology bring new services as typified by P2P network, VoIP and video-on-demand into sight, thereby increasingly changing the environment on a network. As an example, it has been shown that a network state, such as traffic demand, changes greatly and randomly due to an interaction between overlay networks and traffic engineering. For this reason, it is important to realize a virtual network control adaptable to an unexpected change in traffic demand.

To adopt to change in traffic demand and accommodate a traffic on a virtual network effectively, there is proposed an approach (on-line control) of dynamically reconstructing a virtual network, based on periodical measuring of a network and periodical detecting of deteriorations in performance of a virtual network (see non-patent document No. 3). Different from off-line control, since such an on-line control allows the virtual network to be reconstructed in response to a fluctuating traffic, it is possible to cope with fluctuations in traffic demand.

PRIOR ART DOCUMENTS

Non-patent Documents

Non-patent Document No. 1: B. Mukherjee, D. Banerjee, S. Ramamurthy, and A. Mukherjee, "Some principles for designing a wide-area WDM optical network," IEEE/ACM Transactions on Networking, vol. 4, no. 5, pp. 684-696, 1996.

Non-patent document No. 2: R. Ramaswami and K. N. Sivarajan, "Design of logical topologies for wavelength-routed optical networks," IEEE Journal on Selected Areas in Communications, vol. 14, pp. 840-851, June 1996.

Non-patent document No. 3: B. Ramamurthy and A. Ramakrishnan, "Virtual topology reconfiguration of wavelength-routed optical WDM networks," in Proceedings of GLOBECOM, vol. 2, pp. 1269-1275, November 2000.

SUMMARY OF THE INVENTION

Problems to be Solved

Here, the above-mentioned online type control basically assumes that traffic demand matrixes at two given times are acquirable and that the traffic demand fluctuates periodically and moderately without a great fluctuation in the vicinity of optimization. However, it is difficult to acquire a precise traffic demand matrix in a large-scale communication network (see N. Benameur and J. W. Roberts. "Traffic Matrix Inference in IP Networks", NETWORKS AND SPATIAL ECONOMICS, VOL 4; NUMBER 1, page 103-114, 2004). In addition, in a communication network accommodating a number of applications and services, as the traffic demand on the virtual network fluctuates more greatly and unpredictably, it is necessary to establish a virtual network control adaptable to various traffic fluctuations. Moreover, environmental changes on the network contain other factors such as link failures as well as the traffic fluctuations. Therefore, it is important to realize a virtual network control adaptable to various environmental changes including not only traffic fluctuations but also link failures.

Considering such situations of the above-mentioned prior art, the present invention intends to provide a virtual network control method and a virtual network control device both of which can adapt to environmental fluctuations, such as unpredictable traffic demand fluctuation and failures of network constituents with no need for network state information, such as cross traffic information, despite the use of an online type control method.

Solutions to the Problems

In order to attain the above object, as the first aspect of the present invention, it is provided a virtual network control method for adaptively controlling a topology of a virtual network formed on a physical network in response to environmental changes in the virtual network, the control method comprising: a step of storing a Langevin equation, as a fluctuation equation, which models the dynamics of the topology of the virtual network as a variable for controlling the number of wavelength paths on the physical network; a step of designing control parameters included in the fluctuation equation; and a step of controlling the topology of the virtual network by applying the control parameters to the fluctuation equation to change an order parameter included in the fluctuation equation when environmental changes occur in the virtual network, and by transitioning the solution of the fluctuation equation between attractors determined by the deterministic term of the fluctuation equation due to the fluctuation term of the fluctuation equation.

In order to attain the above object, as the second aspect of the present invention, it is also provided a virtual network control device comprising a processing unit executing the respective steps mentioned above.

Effects of the Invention

According to the present invention, it is possible to provide a virtual network control method and a virtual network control device both of which can adapt to environmental fluctuations, such as unpredictable traffic demand fluctuation and failures of network constituents with no need for network state information, such as cross traffic information, despite the use of an online type control method.

According to the present invention, it is also possible to provide a virtual network control method and a virtual network control device both of which can conciliate a competition of virtual networks for resources to realize an appropriate distribution of resources on a physical network.

Still further, according to the present invention, it is possible to provide a virtual network control method and a virtual network control device both of which can follow even unexpected environmental changes.

EMBODIMENTS OF THE INVENTION

Figure 1:
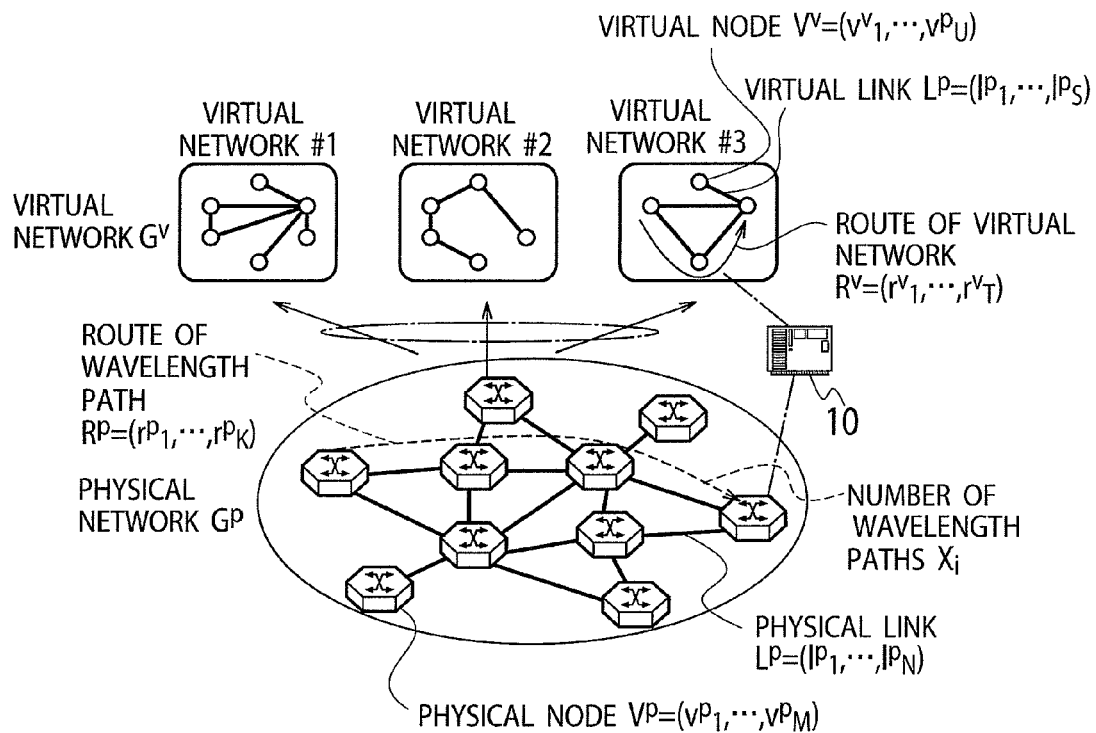
FIG. 1 is a structural view of a network in accordance with the first embodiment of the present invention.

Some embodiments of the present invention will be described below with reference to drawings in detail.

1st. Embodiment

In the first embodiment, the virtual network control is realized on the ground of a fluctuation equation in terms of Langevin equations. In general, the Langevin equation is a stochastic differential equation introducing a fluctuation effect into a dynamic system represented by a differential equation

[Equation 1]

$$\frac{dx(t)}{dt} = g(x(t)). \tag{1}$$

Thus, the stochastic differential equation is described as

[Equation 2]

$$\frac{dx(t)}{dt} = g(x(t)) + \eta(t) \tag{2}$$

where the variable x(t) is a scalar function representing a state of the system. In the following equation, f(x) is a scalar function representing a deterministic rule dominating this system. As a gradient system of a potential Φ, the function f(x) is represented by

[Equation 3]

$$f(x) = -\frac{\delta \Phi(x)}{\delta x}. \tag{3}$$

The potential Φ is a function generally including a plurality of extreme values. In the following equation, η is a function of time "t" representing an incidental effect (fluctuation) to be applied to the system, and this function typically satisfies the following three conditions,

[Equation 4]

$$<\eta(t)>=0, \tag{4.1}$$

$$<\eta(t)\eta(t')>=D\delta(t-t'), \text{ and} \tag{4.2}$$

$$<g(x(0))\eta(t)>=0. \tag{4.3}$$

A typical example of probability distribution of the function η satisfying these conditions is the normal distribution.

Here, the following equation obtained by substituting the equation, g=af, to the Langevin equation (2),

[Equation 5]

$$\frac{dx(t)}{dt} = \alpha f(x(t)) + \eta(t) \tag{5}$$

will be called "fluctuation equation" hereinafter.

Here, α is an order parameter determining whether the solution of the fluctuation equation (5) is dominated by a determinism or fluctuation. If the potential function D has D minimum values, this system has D stable (or metastable) states corresponding to respective minimum values. Assuming that these states are represented by $X_1, X_2, \ldots, X_D$, the deterministic solution of the differential equation (1) converges asymptotically to any one of these D extreme values, depending on the initial condition. In other words, this system converges to a stable (or metastable) state $X_i$. Assuming here that the system is in this stable (or metastable) state $X_i$, if the order parameter α takes a large value in the fluctuation equation (5), the influence of the first term at the right hand side, which is subject to the deterministic rule, becomes more dominative than the influence of the second term representing the fluctuation effect. Thus, in such a case, since the state x of the system cannot overcome a potential barrier, the system still remains in this stable (or metastable) state $X_i$. While, if the order parameter α is small, the influence of the second term at the right hand side becomes more dominative than the influence of the first term. Thus, the system state X can overcome the potential barrier to make a temporal transition from the above stable or metastable state $X_i$ to another stable (or metastable) state $X_j$. This phenomenon is called "transition between attractors by fluctuation". Here, an attractor is mathematically a subset on a phase space to which the asymptotic solution of a differential equation representing a dynamical system converges. In the differential equation (1), the above-mentioned stable (or metastable) states $X_1$, $X_2$, ..., $X_D$ form an attractor as a set of points on one-dimensional phase space.

The Langevin equation (2) is used for describing random movements, such as the movement of fine particles in water and thermal noises generated in electrical circuits. In particular, the fluctuation equation (5) has been also utilized in recent years as a mathematical model to explain the flexible adaptation capability of living organisms against unknown environments based on the mechanism of the attractor transition mentioned above. For instance, there is known a research of modeling a control mechanism of a metabolic network by a gene network in terms of the attractor transition (see C. Furusawa and K. Kaneko, "A generic mechanism for adaptive growth rate regulation," PLoS Computational Biology, vol. 4, p. e3, January 2008). In this model, the gene network is described as $$\frac{dx_i(t)}{dt} = v_g f(x(t)) + \eta(t), \quad (6.1)$$

$$f(x(t)) = sig\left(\sum_{j=1}^{N} W_{ij} \cdot x_j(t) - \theta\right) - x_i(t), \quad (6.2)$$

$$sig(z) = \frac{1}{1 + \exp(-\mu z)}. \quad (6.3)$$

where the suffix "i" (=1, ..., N) represents the number of each gene and the vector $x(t)=(x_1(t), ..., x_N(t))$ represents a pair of proteins in expression level coded by each gene "i". The first term on the right side of the equation (6.1) represents a deterministic rule to control the gene network, while the second term represents a fluctuation generated in this gene network. The equation (6.2) represents a concrete form of the function f (x(t)), in which the first term on the right side denotes a protein $x_i$ in generation level based on an interaction $W_{ij}$ (i, j=1, ..., N) between genes "i" and "j", while the second term denotes the protein $x_i$ in dissolution level. This genetic interaction $W_{ij}$ contains three kinds of effects, that is, activation, inhibition, and neutrality. Note that the genetic interaction $W_{ij}$ also contains an autocatalytic reaction (i=j). The function "sig" in the equation (6.2) represents a sigmoid function concretely expressed in the equation (6.3). The sigmoid function in the equation (6.2) means that the generation level $x_i$ of the protein coded by the gene "i" is activated when a weighted summation of the generation level $x_j$ of the gene coded by the other gene "j" on the gene network exceeds a threshold value θ. The function f(x) having such a feature has an attractor structure.

This gene network is controlled by a value of the activity $v_g$ representing the state of a metabolism network as an object to be controlled. When the state of the metabolism network deteriorates, the activity $v_g$ is decreased. As a result, since the influence of a fluctuation η gets increased relatively, the expression level $x=(x_1, ..., x_N)$ of protein varies randomly. When the state of the metabolism network is improved with the change of x, the activity $v_g$ will increase. Consequently, the quantity x of the generated protein is controlled by an effect f(x) based on a deterministic law including the genetic interaction and the protein degradation, dominantly. Thus, this model has a mathematical structure where the dominance relationship between the term f(x) based on the deterministic law and the term η based on the fluctuation is interchanged according to the activity $v_g$ of the metabolism network.

This model is a biological model describing the behavior of cells composed of two layers, that is, a gene network and a metabolism network. As mentioned above, the gene network is operable to control the expression level $x_i$ of protein encoded to each gene. The metabolism network produces substrates required for the growth of cells through metabolic reactions. These metabolic reactions are controlled by the expression level $x_i$ of each protein. Since the amounts of these substrates determines the growth rate of cells, an activity $v_g$ is determined based on the concentration of substances. Then, the activity $v_g$ determined by the metabolism network is fed back to dynamics of the gene network through the fluctuation equation (6). The deterioration of the metabolism network due to environmental changes is reflected as a reduction in the value of the activity $v_g$. When the value of the activity $v_g$ is low, the fluctuation η controls the gene network dominantly so that it is performed to search a new state (attractor) suitable to its environment in place of the past state (attractor). When the new state (attractor) suitable to the environment is discovered by the fluctuation η and the metabolism network is further recovered, the value of the activity $v_g$ increases correspondingly. This increase in value of the activity $v_g$ allows this attractor to be brought into a stable (or metastable) state by the deterministic term f(x). Thus, in this mathematical model, as the gene network judges the state of the metabolism network through the value of the activity $v_g$ and further controls the balance between η and f(x) on the basis of this value appropriately, the adaptability to environmental changes is realized. This mechanism will be called "attractor selecting mechanism based on fluctuation" hereinafter.

In general, a heuristics approach previously prepares an algorithm as countermeasures against a certain environmental changes to ensure the environmental adaptability. Therefore, although high environmental applicability can be realized against an envisioned environmental change, this approach is unadaptable to unexpected environmental changes. On the contrary, since the above-mentioned attractor selecting mechanism is driven by a fluctuation, it has an advantage of adaptability against unknown environmental changes although the achievable state is mostly metastable (suboptimum).

(Network Constitution)

The present invention assumes a network which utilizes, as an infrastructure, a virtual network where an upper network such as IP/MPLS is constructed through wavelength paths that a physical network provides by means of wavelength routing. An example of adopting a WDM network as the physical network will be illustrated in detailed descriptions hereinafter. However, it should be noted that the present invention is also applicable to a physical network composed of layer 2 networks, such as fiber network, TDM (Time Division Multiplexing) network and Ethernet (trade mark).

FIG. 1 shows a network structure according to the first embodiment of the present invention. A physical network $G^P$ comprises physical nodes $V^p$ and physical links $L^P$. The physical links $L^P$ accommodate a plurality of wavelengths by using WDM technique. The physical nodes $V^p$ are connected with each other through a wavelength path by means of wavelength routing. The physical network $G^P$ accommodates a plurality of virtual networks $G^V$ (in this case, #1~#3). The physical network $V^p$ provides the virtual network $G^V$ with a topology of the respective virtual networks $G^V$ composed of wavelength paths. Here, the function of designing/controlling the virtual network topologies $G^V$ is assumed by the virtual network control device 10. The virtual network control device 10 connects the physical network $G^P$ with the virtual networks $G^V$. The virtual network control device 10 includes means for acquiring the state information, such as the physical network topology $G^P$, the information of the virtual network topologies $G^V$ and the performance information, such as ink utilization ratios on the virtual networks $G^V$ and throughputs.

In addition, for environmental changes in the virtual networks $G^V$, the virtual network control device 10 retains the function of designing the virtual network topologies $G^V$ adaptable to the environmental changes on the basis of a later-mentioned fluctuation equation, thereby reconstructing the present virtual network topologies $G^V$. Logically, the virtual network control device 10 is arranged with respect to each virtual network #1~#3 to control the topology of the virtual network of its own and exchange various types of control information with the virtual network control devices belonging to the other virtual networks. Although the number of virtual network control devices 10 becomes equal to the number of virtual networks #1~#3 logically, they may be physically embodied by a centralized control system realized by a single hardware.

(Constitution of Virtual Network Control Device 10)

Figure 2:
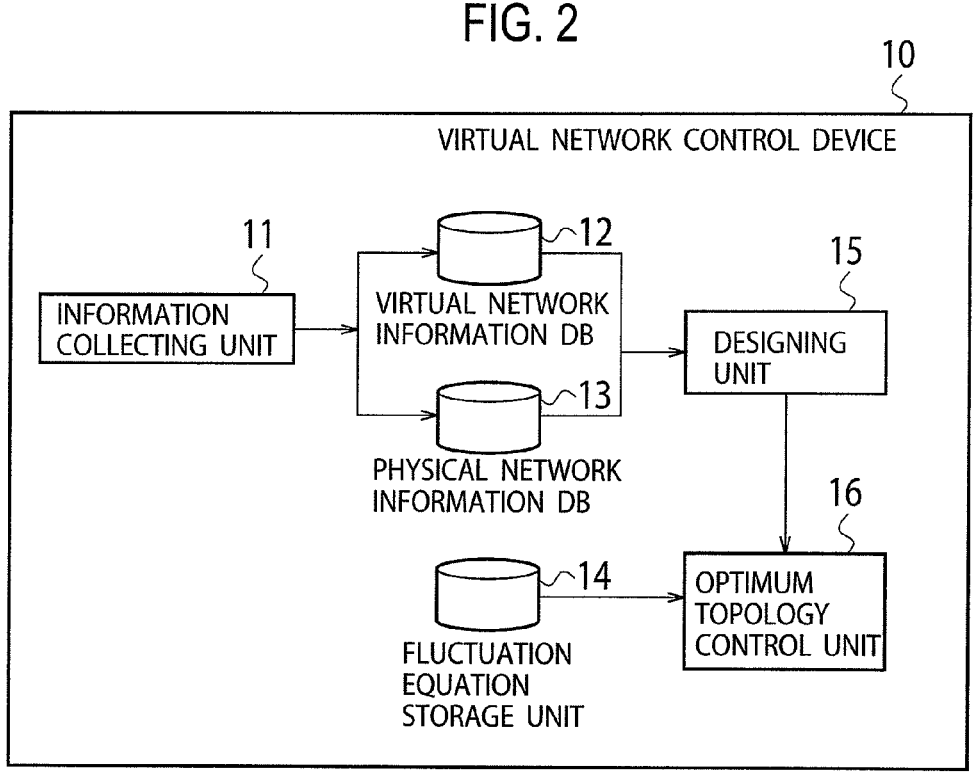
FIG. 2 is a structural view of a virtual network control device in accordance with the first and second embodiments of the present invention.
Figure 3:
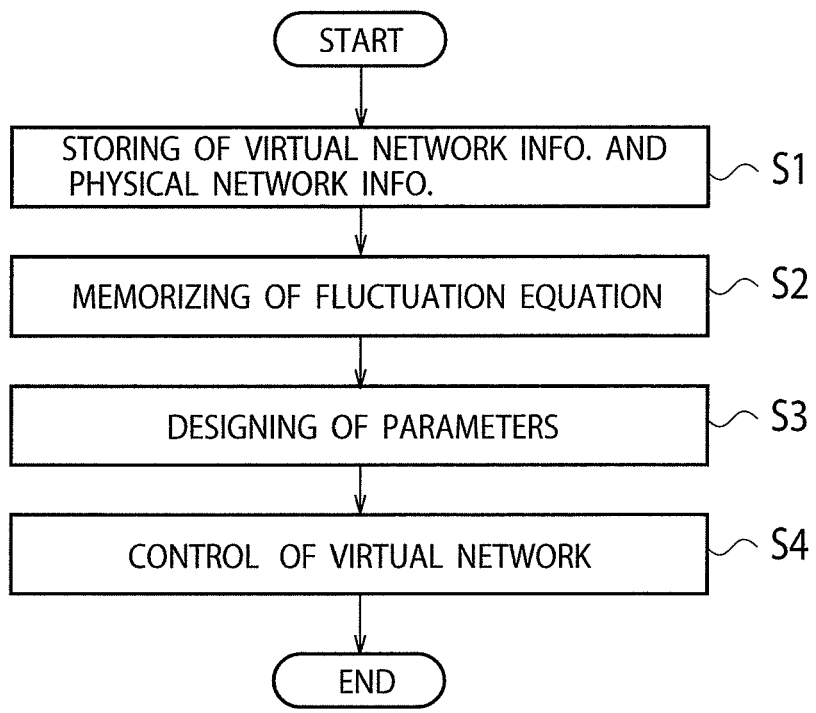
FIG. 3 is a flow chart showing the central operation of the virtual network control device of FIG. 2.

FIG. 2 is a structural view of the virtual network control device 10 of the present invention. FIG. 3 is a flow chart showing the central operation of the same device. As shown in FIG. 2, the virtual network control device 10 includes an information collecting unit 11, a virtual network information DB 12, a physical network information DB 13, a fluctuation equation storage unit 14, a designing unit 15 and an optimum topology control unit 16.

The information collecting unit 11 is operable to measure "virtual network information" including the virtual network topologies $G^V$, routing information about traffic, traffic information, such as the utilization ratio of link, and performance information, such as throughput and maximum utilization ratio of link. The information collecting unit 11 also measures "physical network information" including the physical network topology $G^P$, routing information about wavelength paths and performance information, such as transmission capability. The virtual network information DB 12 stores the virtual network information measured by the information collecting unit 11, while the physical network information DB 13 stores the physical network information measured by the information collecting unit 11 (at step S1 of FIG. 3). If the state of the physical network $G^P$ is not changed, all the device has to do is just only to store the physical network information in the physical network information DB 13 in advance. Therefore, the information collecting unit 11 does not always have to collect the physical information. The fluctuation equation storage unit 14 memorizes the fluctuation equation realizing the attractor selecting mechanism (at step S2 of FIG. 3). The designing unit 15 is operable to design the parameters of the fluctuation equation (at step S3 of FIG. 3). The optimum topology control unit 16 is operable to apply the parameter designed by the designing unit 15 to the fluctuation equation and calculate the virtual network topologies $G^V$ based on this fluctuation equation to control the virtual network $G^V$ (at step S4 of FIG. 3). Although FIG. 2 illustrates the fluctuation equation storage unit 14 and the optimum topology control unit 16 as different components, the fluctuation equation storage unit 14 may be incorporated into the optimum topology control unit 16.

(Virtual Network Control)

Next, the virtual network control method by the attractor selecting mechanism based on fluctuation will be described. In the above-mentioned mathematical model to control cell metabolism, the gene network controls the state of the metabolism network deteriorating due to environmental changes. In contrast, the virtual network control of the present embodiment is intended to control the virtual network $G^V$ appropriately when the network performance of the virtual network $G^V$ deteriorates due to environmental changes, in view of recovering the network performance. Therefore, it is attempted to associate the gene network with the physical network $G^P$ as well as associating the metabolism network with the virtual network $G^V$. Consequently, according to the virtual network control of this embodiment, an appropriate attractor selection is accomplished in the physical network $G^P$ since the order parameter changes with the degradation of the virtual network. Then, the result of this attractor selection is fed back to the virtual network $G^V$ so that the state of the virtual network $G^V$ can be improved.

The virtual network control in this embodiment uses the following fluctuation equation,

[Equation 7]

$$\frac{dx_i(t)}{dt} = \alpha \left\{ sig\left(\sum_{j=1}^{n} W_{ij} \cdot x_j(t) - \theta_i\right) - x_i(t) \right\} + \eta_i(t) \quad (7)$$

where the suffix "i" (i=1, . . . , n) represents a node pair as the arrival/departure points of a wavelength path in a WDM network as the physical network $G^P$. The function $x_i(t)$ is a variable which controls the number of the wavelength paths of which arrival/departure points are a node pair "i" at time "t" in common. By multiplying this variable $x_i(t)$ by a suitable filter function such as step function, the variable is converted to a natural numerical value. In this embodiment, this natural numerical value is defined as the number of the wavelength paths. The matrix element $W_{ij}$ represents the relation of activation or inhibition, which is established between a wavelength path having a node pair "i" as the arrival/departure points and another wavelength path having a node pair "j" as the arrival/departure points. An "n×n" matrix W having these elements $W_{ij}$ will be referred to as "regulatory matrix" below. Further, the constant number $\theta_i$ represents a threshold value of $x_i(t)$ in the sigmoid function for a weighted summation by the regulatory matrix W. Similarly to the above-mentioned mathematical model to control cell metabolism, a function representing a term subject to the deterministic rule, which is in the brace on the right side of the fluctuation equation (7), has attractors. The function $\eta_i$ represents an effect of fluctuations. For a probabilistic distribution of the effect of fluctuations, the normal distribution is assumed. In the equation, a parameter $\alpha$ is an activity representing the state of the virtual network $G^V$, which is determined by measuring the virtual network $G^V$. For instance, maximum link utilization rate of the virtual network $G^V$, its throughput, and others are available for the activity α. The attractor selecting mechanism of the present embodiment is a mechanism that determines the number $x_i(t)$ of wavelength paths at each time "t" with the activity a representing the state of the virtual network $G^V$ as the order parameter. Thus, by applying the fluctuation equation (7) periodically or every time the environmental fluctuation does occur, the mechanism calculates the number $x_i(t)$ of wavelength paths to be established between respective node pairs. By adding or subtracting a difference between the so-obtained number and the number $x_i(t)$ of wavelength paths that has been established previously, the virtual network topologies $G^V$ can be altered into its optimum state.

As mentioned above, the elements $W_{ij}$ of the regulatory matrix W denote the relation of activation-inhibition established between the wavelength path having the node pair "i" as the arrival/departure points and the wavelength path having the node pair "j" as the arrival/departure points. Here, "activation-inhibition" is defined as the ease of establishing the wavelength path having the node pair "j" as the arrival/departure points in comparison with that of the wavelength path having the node pair "i" as the arrival/departure points. That is, if the mutual wavelength paths are in the relation of activation ($W_{ij}$>0), such a situation means that the latter wavelength path is easy to be established in comparison with the former wavelength path. Conversely, if the mutual wavelength paths are in the relation of inhibition ($W_{ij}$<0), such a situation means that the latter wavelength path is difficult to be established in comparison with the former wavelength path. Alternatively, if there is no need to establish any special relation between each other's wavelength paths (i.e. a case of no need of activating or inhibiting the establishment of the latter wavelength path despite the establishment of the former wavelength path), "$W_{ij}$=0" is established. In this way, the connective structure of wavelength paths between the node pairs (i, j) is controlled by the regulatory matrix W. Accordingly, if only the regulatory matrix W is designed in accordance with a given condition for the physical network $G^P$ appropriately, it is possible to provide a virtual network control mechanism adaptable to environmental changes. Nevertheless, it has been actually unknown the design method of the regulatory matrix W under a variety of network conditions, such as the physical network topology $G^P$. That is why the present embodiment provides an appropriate method of designing the regulatory matrix W.

Moreover, as the activity a can be also regarded as an index representing the virtual network topologies $G^V$, it is possible to adopt e.g. the maximum link utilization rate of the virtual network $G^V$ and the throughput as the activity α, as mentioned above. However, it should be noted that when the value of the activity a gets increased, it is judged that the state of the virtual network $G^V$ has been improved. Therefore, as for an index such as the maximum link utilization rate whose reduction would induce a judgment that the state of the virtual network $G^V$ has been improved, the form of the index has to be modified, for example, by setting the reciprocal of the index as the activity α, so that the activity a gets increased if the state of the virtual network $G^V$ is improved.

The method of designing the regulatory matrix W will be described below with reference to two examples.

Example 1

First, the design method of the regulatory matrix W will be described in Example 1. Since the virtual network topologies $G^V$ as an attractor is defined by the regulatory matrix W, it is important to design the regulatory matrix W appropriately in view of ensuring both followability and reliability of the virtual network $G^V$ to environmental fluctuations. Information available for the design of the regulatory matrix W comprises the physical network topology $G^P$, the physical link $L^P=(l^P_1, \ldots, l^P_N)$, the physical node $V^P=(v^P_1, \ldots, v^P_M)$, the virtual network topologies $G^V$, the link $L^P=(l^P_1, \ldots, l^P_S)$ on the virtual network $G^V$, the link load $U=(u_1, \ldots, u_S)$, the route information $R^P$ of the wavelength paths, and the route information $R^V$ on the virtual network $G^V$ (see FIG. 1).

Figure 4:
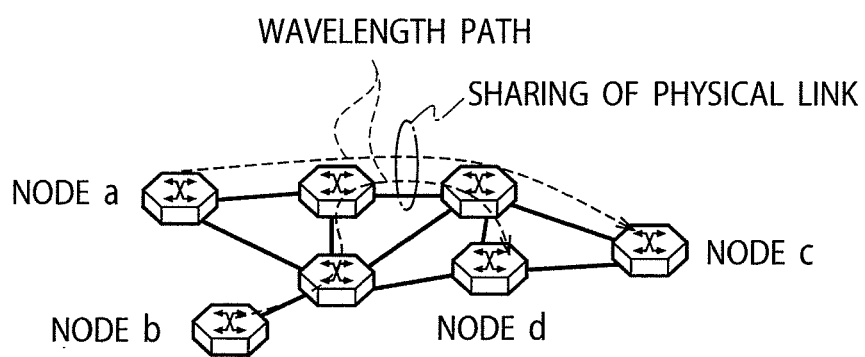
FIG. 4 is a view showing an example of a calculation procedure of an inhibition relation of the present invention.

Here, let us explain the method of extracting a combination (i, j) of node pairs to establish an inhibition relation therebetween and the calculating procedure of the regulatory matrix W (see FIG. 4). Such a situation that the combination (i, j) of node pairs is in the inhibition relation means that if a wavelength path is established to the node pair "i", it becomes difficult to establish a wavelength path to the node pair j.

<Calculating Procedure of Inhibition Relation>

1. A set of wavelength-path routes $R^P$ is designed from the physical network topology $G^P$. Algorithms, such as Dijkstra's algorithm and linear programming, are available for the route calculation.

2. All pairs of wavelength paths sharing at least one physical link $l^P_i$ are extracted from the set $R^P$ of wavelength-path routes. Further, a combination of node pairs forming arrival/departure points of the extracted wavelength paths is extracted, and a list $\{(p_1, q_1), \ldots, (p_n, q_n)\}$ of combinations of node pairs establishing the inhibition relation is created.

3. A negative real number β (e.g. -1) is set to respective elements $W_{pi,qi}$ of the regulatory matrix W corresponding to each node-pair combination $(p_i, q_i)$ in the list $\{(p_1, q_1), \ldots, (p_n, q_n)\}$ of combinations of inhibition node pairs.

FIG. 4 shows one application of the above calculating procedure. In FIG. 4, multiple wavelength paths are designed as the set $R^P$ of wavelength-path routes in the physical network $G^P$ consisting of seven nodes. The possibility of establishing respective wavelength paths on the physical network $G^P$ is controlled by the fluctuation equation (7). In the set $R^P$ of routes, two wavelength paths between nodes (a, c) and between nodes (b, d) are sharing a physical link in common. The negative real number β is set to the elements $W_{p1,q1}$ of the regulatory matrix W corresponding to the node pair $p_1$=(a, c) and the node pair $q_1$=(b, d). Here the regulatory matrix W is a matrix of {node pair (=wavelength)×node pair (=wavelength)}.

Figure 5:
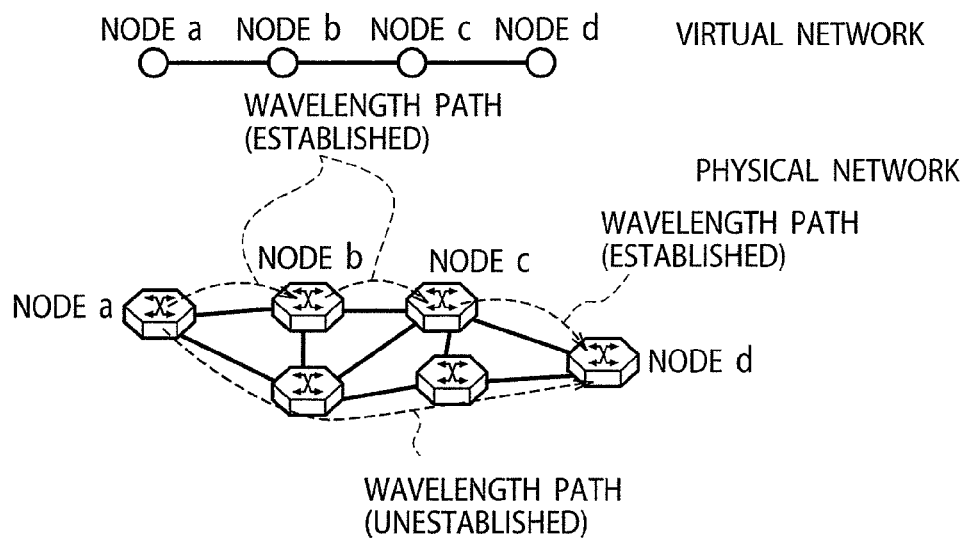
FIG. 5 is a view showing a calculation procedure 1 of an activation relation of the present invention.
Figure 6:
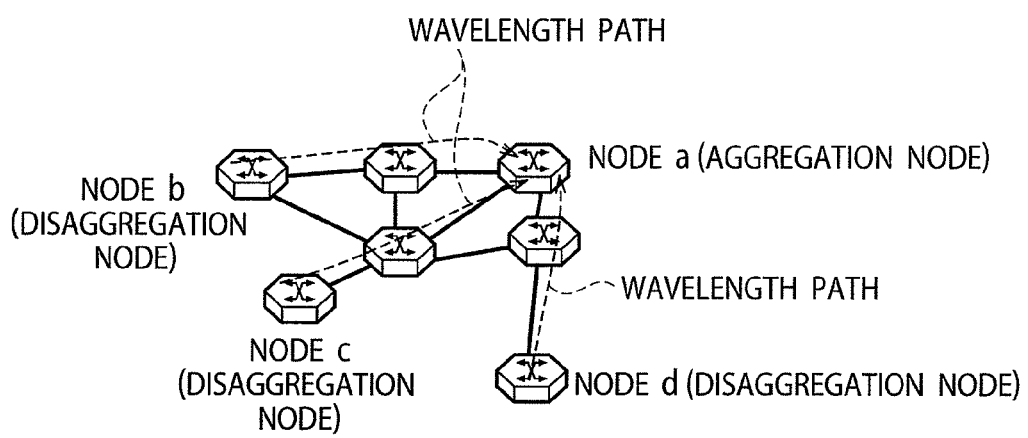
FIG. 6 is a view showing a calculation procedure 2 of the activation relation of the present invention.

Next, let us explain the method of extracting a combination (i, j) of node pairs to establish an activation relation therebetween and the calculating procedure of the regulatory matrix W (see FIG. 5 and FIG. 6). Such a situation that the combination (i, j) of node pairs is in the activation relation means that if a wavelength path is established to the node pair "i", it becomes easy to establish a wavelength path to the node pair "j". There are two kinds of calculating procedures about the activation relation.

<Calculating Procedure 1 of Activation Relation>

1. A set of wavelength-path routes $R^P$ is designed from the physical network topology $G^P$. Algorithms, such as Dijkstra's algorithm and linear programming, are available for the route calculation.

2. A pair of wavelength paths to which the activation relation is established is selected in accordance with the following wavelength-path establishment policies.

(a) One wavelength path constituting a virtual link through which traffic, which is transmitted from the route information $R^V$ of the virtual network $G^V$ in multi-hop, passes and another wavelength path having terminal points of arrival/departure nodes of the above traffic.

(b) Wavelength paths constituting any two virtual links in the virtual links through which traffic, which is transmitted from the route information $R^V$ of the virtual network $G^V$ in multi-hop, passes.

(c) Wavelength paths both increasing the cut capacity between an arrival point and a departure point of a certain traffic.

3. A combination of nodes forming the arrival/departure points of two extracted wavelength paths is extracted, and a list $\{(p_1, q_1), \ldots, (p_n, q_n)\}$ of combinations of node pairs establishing the activation relation is created.

4. A positive real number γ (e.g. 1) is set to respective elements $W_{pi,qi}$ of the regulatory matrix W corresponding to each node-pair combination $(p_i, q_i)$ in the list $\{(p_1, q_1), \ldots, (p_n, q_n)\}$ of combinations of activation node pairs.

FIG. 5 shows one application of the above calculating procedure 1. In FIG. 5, the virtual network $G^V$ is accommodated in the physical network $G^P$ consisting of six nodes. On the virtual network $G^V$, respective virtual nodes are connected with each other through three virtual links so that the traffic between the node "a" and the node "d" is transmitted through three hops. As this case is applicable to the above wavelength-path establishment policy (a), it becomes established the activation relation between one wavelength path directly connecting the node "a" with the node "d" (a wavelength path shown with the lower dot-line arrows in the physical network $G^V$: defined as "$q_{ad}$") and another wavelength path formed by three wavelength paths of the existing node pair $p_1$=(node "a", node "b"), node pair $p_2$=(node "b", node "c") and node pair $p_3$=(node "c", node "d") (a wavelength path formed by the upper three dot-line arrows: defined as "$p_{abcd}$"), so that the positive real number γ is set to respective elements $W_{pabcd,qad}$ of the corresponding regulatory matrix W.

<Calculating Procedure 2 of Activation Relation>

1. A set of wavelength-path routes $R^P$ is designed from the physical network topology $G^P$. Algorithms, such as Dijkstra's algorithm and linear programming, are available for the route calculation.

2. Aggregation nodes $V_p^a$ are determined from a set $V_p$ of physical nodes on the physical network $G^P$ by any of the following methods. Here, a set of nodes other than the aggregation nodes is set to "set $v_p^{na}$ of disaggregation nodes". A set of aggregation nodes $V_p^a$ is a subset of the set $V_p$ of physical nodes and also a set of nodes to be aggregation points of a traffic for improving the transfer efficiency of traffic.

(a) The top "R" nodes out of the physical nodes on the physical network $G^P$ is specified, in descending order of the number of links accommodated in the specified node or in descending order of the sum of link capacities accommodated in the specified node.

(b) "R" physical nodes are specified so that they are uniformed geographically (e.g. equalizing of the number of installed nodes with respect to each region). Note that the parameter "R" is an integer equal to or more than 1 and is set to a number within a range from 10% to 30% of the total number of nodes.

3. A combination of node pairs satisfying any of the following conditions is extracted as the combination of activation node pairs.

(a) Node pairs that any two nodes in the disaggregation nodes $V_p^{na}$ are established as the starting or ending points while a node belonging to the aggregation nodes $V_p^a$ is established as the ending or starting point. That is, a wavelength path setting a disaggregation node as the starting (ending) point is activated so as to have an aggregation node set as the ending (starting) point.

(b) A combination of node pairs that any two nodes in the aggregation nodes $V_p^a$ are established as the starting points while another node belonging to the aggregation nodes $V_p^a$ is established as the ending point. That is, a pair of wavelength paths connecting the aggregation nodes with each other is activated.

4. A list $\{(p_1, p_2), \ldots, (p_n, p_n)\}$ of combinations of extracted activation node pairs is created.

5. A positive real number γ (e.g. 1) is set to respective elements $W_{pi,pi}$ of the regulatory matrix W corresponding to each node-pair combination $(p_i, p_j)$ in the list $\{(p_1, p_2), \ldots, (p_n, p_n)\}$ of combinations of activation node pairs.

FIG. 6 shows one application of the above calculating procedure 2. FIG. 6 illustrates a physical network consisting of seven nodes. In this example, the node "a" is established as the aggregation node while the nodes "b", "c", "d" and the other nodes are established as the disaggregation nodes. Then, a positive real number γ is set to the elements $W_{pi,qj}$ (i≠j: i, j=1, 2, 3) of the regulatory matrix W so that it becomes established the activation relation between the wavelength paths connecting the node pair $p_1$=(node "a", node "b"), node pair $p_2$=(node "a", node "c") and node pair $p_3$=(node "a", node "d").

By the above procedure, a negative real number "β" is set to the elements $W_{i,j}$ of the regulatory matrix W corresponding to a combination of node pairs falling into the inhibition relation, while the positive real number "γ" is set to the elements $W_{i,j}$ of the regulatory matrix W corresponding to a combination of node pairs falling into the activation relation. Further, "0" is set to the elements $W_{i,j}$ of the regulatory matrix W corresponding to a combination of node pairs falling into neither the activation relation nor the inhibition relation.

Here, the above calculating procedures of the activation relation and the inhibition relation are executed to the same regulatory matrix W. However, as for the calculating procedure of the activation relation, the regulatory matrix W may be calculated by applying either the calculating procedure 1 or the calculating procedure 2. In designing a large-scale network, it is structuralized by applying the calculating procedure 2 of the activation relation, thereby allowing the network to be improved in its resource utilization efficiency. In designing a small-scale network, it is possible to construct the virtual network topologies $G^V$ having sufficiently-high traffic transfer efficiency by applying the calculating procedure 1 of the activation relation.

Example 2

Next, the design method of the regulatory matrix W will be described in Example 2. Since the virtual network topologies $G^V$ as an attractor is defined by the regulatory matrix W, it is important to design the regulatory matrix W appropriately in view of ensuring both followability and reliability of the virtual network $G^V$ to environmental fluctuations. Then, it is important for the fluctuation equation (7) to incorporate the regulatory matrix W expressing the virtual network topologies $G^V$ as a plurality of attractors, in advance. That is, by previously designing the virtual network topologies $G^V$ providing a plurality of attractors resistant to environmental fluctuations, by defining the regulatory matrix W embodying their topologies and by incorporating the matrix W into the fluctuation equation (7), it is possible to control the virtual network $G^V$ capable of following environmental fluctuations appropriately.

The regulatory matrix W is an object to be designed. In the elements $W_{i,j}$ of the regulatory matrix W, the suffixes "i", "j" represent node pairs respectively. Thus, the elements $W_{i,j}$ is defined with respect to each combination of node pairs (i, j). Similarly to Example 1, information available for the design of the regulatory matrix W comprises the physical network topology $G^P$, the physical link $L^P=(l^P_1, \ldots, l^P_N)$, the physical node $V^P=(v^P_1, \ldots, v^P_M)$, the virtual network topologies $G^V$, the link $L^P=(l^P_1, \ldots, l^P_S)$ on the virtual network $G^V$, the link load $U=(u_1, \ldots, u_S)$, the route information $R^P$ of the wavelength paths, and the route information $R^v$ on the virtual network (see FIG. 1).

As mentioned before, a candidate for the virtual network topologies $G^V$ calculated by the fluctuation equation (7) is determined by the regulatory matrix W. Therefore, a plurality of candidates of the virtual network topologies $G^V$ highly resistant to environmental fluctuations are created in advance. Then, the regulatory matrix W is designed so that these candidates are selected as solutions of the fluctuation equation (7), and the designed regulatory matrix W is incorporated into the fluctuation equation (7). It should be noted here that the topology highly resistant to environmental fluctuations is a appropriate topology to be selected to recover the network performance (activity a) reduced due to environmental fluctuations.

Figure 7:
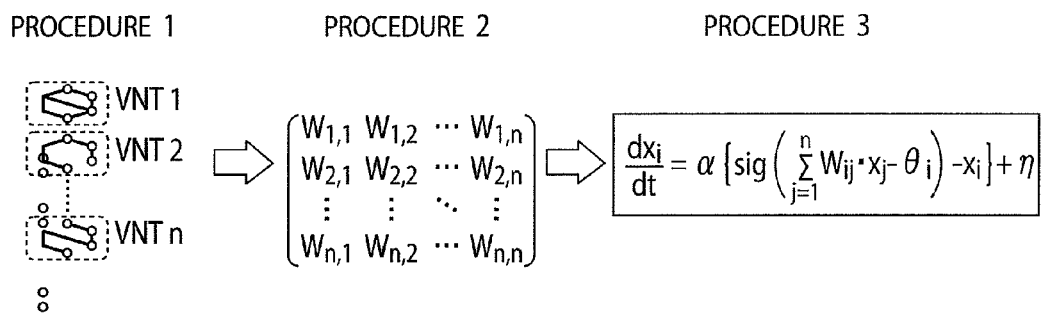
FIG. 7 is a view showing an example of an incorporating procedure of a regulatory matrix of the present invention.

The detailed incorporating procedure will be described below with reference to FIG. 7.

1. N candidate cross traffics $T^{(k)}$ satisfying the following equation about a cross traffic T of the virtual network $G^V$ is created on the basis of the route information RV of the virtual network $G^V$ observed at a certain point in time and the load information U of a virtual link,

[Equation 8]

$$U = R^V \cdot T. \quad (8)$$

In the equation (8), since the cross traffic T is a variable difficult to be observed practically, estimated values whose summation becomes equal to a load of the virtual link are regarded as the candidate cross traffics. These candidate cross traffics are equivalent to a group of cross traffics which might be produced due to the potential environmental fluctuations.

2. N candidate topologies $G^{V(k)}$ corresponding to the candidate cross traffics $T^{(k)}$ are created. Algorithms disclosed in non-patent documents Nos. 1, 2 and 3 are available for the method of calculating the topology of the virtual network $G^V$ from the cross traffic. Here the candidate topologies $G^{V(k)}$ are defined by candidates for topology that might be selected as a result of the virtual network control based on the fluctuation equation (7). The topology of the virtual network $G^V$ can be calculated in the following procedure.

(a) One of the corresponding cross traffics $T^{(k)}$ is selected.

(b) Node pairs from nodes in descending order of cross traffic volume are selected, and further light paths to the selected node pairs are set.

(c) The connectivity of nodes is confirmed, and a light path for connecting with the other node (for a node having no connectivity) is added.

(d) A cross traffic $T^{(k)}$ is accommodated, and a light path between the identical nodes (for a light path having a high utilization ratio) is added.

3. A regulatory matrix W for the candidate topologies $G^{V(k)}$ is calculated by, for example, the theory of neural networks theory (see J. J. Hopfield, "Neural networks and. physical systems with emergent collective computational abilities," Proceedings of the National Academy of Sciences of the United States of America, vol. 79, pp. 2554-2558, April 1982).

4. The calculated regulatory matrix $W_{ij}$ is incorporated into the fluctuation equation (7).

In this way, it becomes possible to select the virtual network topologies $G^V$ resistive to environmental fluctuations without observing the information about cross traffic through the network.

As mentioned above, according to the first embodiment, control a virtual network is controlled by the fluctuation equation. Even in the online type control method, it is possible to construct the virtual network topologies capable of following environmental fluctuations, such as unpredictable traffic demand fluctuation and failures of network components, without requiring the information about network condition such as cross traffic. In particular, since the first embodiment can provide a method of designing parameters of the virtual network control device capable of establishing a wavelength path and eliminating an ineffective path on the basis of the fluctuation equation, it is possible to improve the utilization efficiency of resources and the network performance. More detailed effects of the first embodiment are as follows.

First, as the fluctuation equation can calculate the virtual network topologies without using the information about cross traffic, which is difficult to be observed in a large scale network, it is possible to realize scalability applicable to also a large scale network.

Second, a fluctuation equation can be solved by a numerical simulation with the Monte Carlo method. Alternatively, if the probability distribution of fluctuation η is the normal distribution, the solution of a fluctuation equation is obtained by solving the Pokker-Plank equation equivalent to the fluctuation equation. In either case, as the computational complexity is low in comparison with the computational complexity of solving a strict optimization problem, it is possible to calculate a solution to a large-scale network in a short time. Thus, the time required for control can be shortened, and thereby improving the adaptability to environmental fluctuations.

Third, since appropriately-controllable conditions are limited in the conventional control method, it is impossible to adapt it to unexpected environmental fluctuations. On the contrary, the control method according to the present invention is based on the fluctuation equation. Owing to the adoption of the fluctuation equation, if the environmental fluctuations beyond the scope of the previous assumption are generated to degrade the network performance, a random search can be performed to search new topologies by fluctuations, thereby selecting a topology improving the network performance. That is, it is possible to establish the reliability and stability in unexpected environmental fluctuations.

Fourth, according to the parameter designing method of the fluctuation equation of the first embodiment, as the parameters of the fluctuation equation can be appropriately designed by using only the topologies of a network and information easy to be actually observed from the network, it is possible to realize a consistently-suitable control in an arbitrary network. In particular, although the parameters have been conventionally designed by trial and error repeated according to an operator's experience, an operator's burden is reduced by automating the parameter designing in this embodiment.

$2^{nd}$. Embodiment

The second embodiment adheres fundamentally to the concept of the first embodiment. The feature of the second embodiment is as follows: resides in that the competition of virtual networks for resources is conciliated by extending an attractor selection model for a single virtual network to the attractor selection on a plurality of virtual networks, thereby accomplishing an appropriate distribution of resources on a physical network. Consequently, on each virtual network, the virtual network control adaptable to environmental changes is realized due to the attractor selection for a single virtual network. Simultaneously, even in a viewpoint of the network as a whole, the attractors' competition for resources is avoided to realize the network control with a high stability.

When there exists no interaction between attractors in a plurality of virtual networks, the competition of resources is not conciliated appropriately. Let us assume that the activity of one virtual network A is low while the activity of another virtual network B is high. In addition, it is assumed that the virtual network B is already using resources for constructing a virtual network corresponding to an attractor for recovering the present situation of the virtual network A. Then, as the virtual network B does not change, the virtual network A cannot construct a virtual network corresponding to an attractor for recovering the present situation. Therefore, since the activity does not recover, the virtual network topology A cannot attain a stable topology under the influence of noises. This phenomenon comes from the fact that the activities of attractors operating on the respective virtual networks A, B are independent of each other. According to the second embodiment, it is therefore introduced an interaction between the activities of a plurality of virtual networks, thereby allowing the virtual network control of the whole networks to be adaptively-operate by considering each other's conditions of the attractors.

To that end, when the activity of the virtual network corresponding to a certain attractor does not rise, the virtual network control device has to reduce the activity of the virtual networks corresponding to the other attractors to cause a transition from the topology of the present virtual network to a topology of the other virtual networks. For this purpose, it is necessary to induce a reconstruction of a virtual network occupying resources by lowering the activities of the whole virtual networks appropriately.

Figure 8:
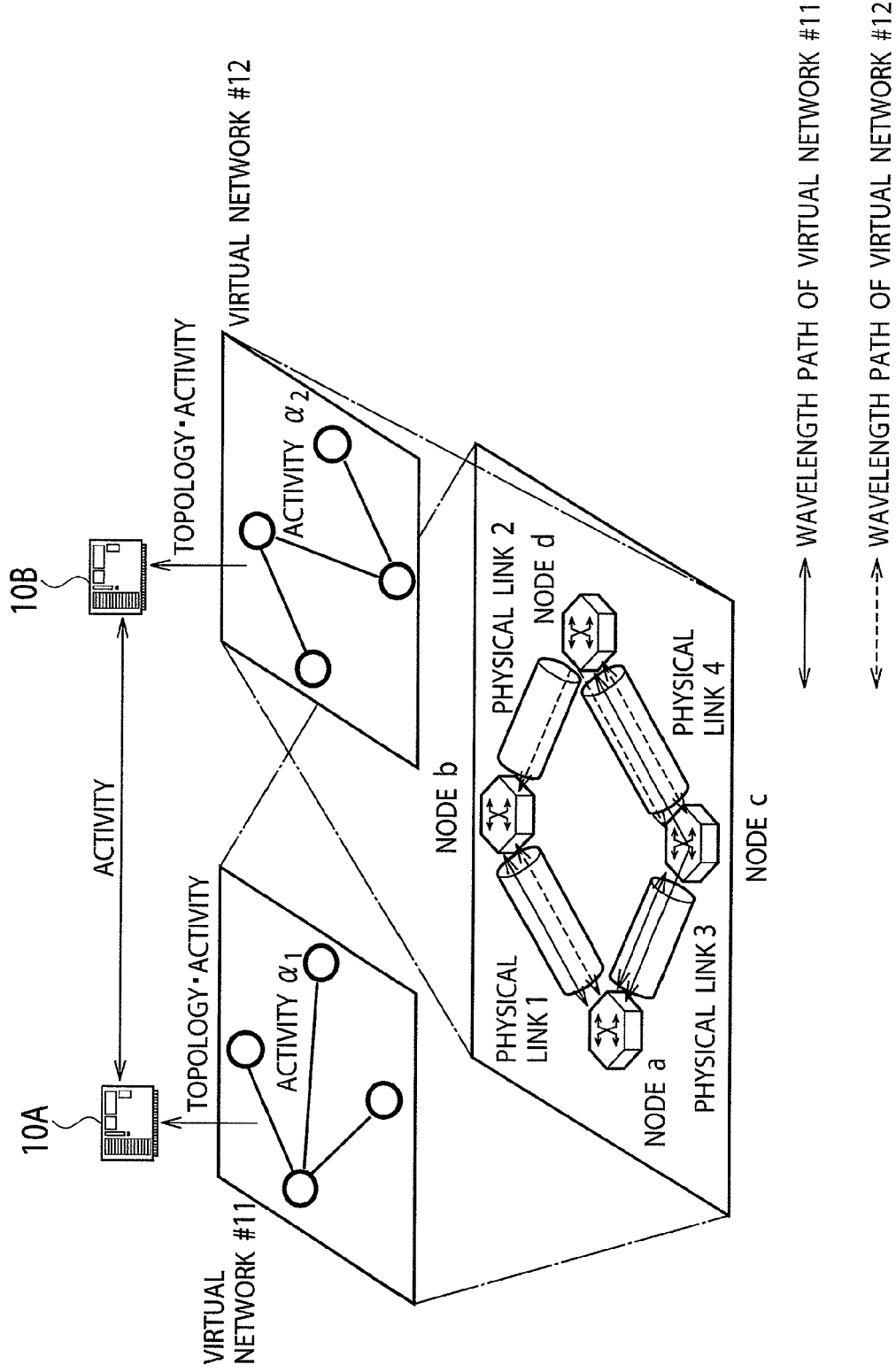
FIG. 8 is a structural view of a network in accordance with the second and third embodiments of the present invention.

FIG. 8 shows the network structure of the second embodiment. This network structure is basically similar to network structure (FIG. 1) of the first embodiment. That is, the physical network comprises physical nodes and physical links. The physical links accommodate a plurality of wavelengths by WDM technique. The physical nodes are connected with each other through a wavelength path by means of wavelength routing. The physical network accommodates one or more virtual networks (in this case, #11 and #12). The physical network provides the respective virtual networks with respective virtual network topologies composed of wavelength paths. Here, the functions of designing/controlling the virtual network topologies are assumed by respective virtual network control devices 10A and 10B. The virtual network control devices 10A and 10B connect the physical network with the virtual networks. The virtual network control devices 10A and 10B include means for acquiring the state information, such as the physical network topologies, the information of the respective virtual network topologies and the performance information, such as respective link utilization ratios on the virtual networks and throughputs. For environmental changes in the virtual network, the virtual network control devices 10A and 10B also retain the functions of designing the topologies adaptable to the environmental changes on the basis of a later-mentioned fluctuation equation, thereby reconstructing the present virtual network topologies. Processing units of the virtual network control devices 10A and 10B are similar to those of the virtual network control device 10 shown in FIG. 2. However, the designing unit 15 of this embodiment has a function of interacting the activity between the virtual networks sharing resources of the physical network in designing the parameters of the fluctuation equation.

Let a $k^{th}$ virtual network be referred to as "virtual network "k"". It is further assumed that $x_i^k(t)$ ($i=1, \ldots, n_k$, $k=1, \ldots, K$) is the number of wavelength paths having arrival/departure points of a node pair "i" on the virtual network "k" at a time "t". Then, the virtual network control of the present embodiment uses the following fluctuation equation,

[Equation 9]

$$\frac{dx_i^k}{dt} = \langle \alpha \rangle \left\{ sig\left( \sum_{j=1}^{n_k} W_{ij}^k \cdot x_j^k - \theta_i^k - \beta \sum_{k=1}^{K} x_i^k \right) - x_i^k \right\} + \eta_i^k \quad (9)$$

where the function "sig" is a sigmoid function. The function $\eta_i^k$ denotes a fluctuation with the normal distribution as well as the first embodiment. The matrix element $W_{ij}^k$ represents the relation of activation or inhibition, which is established between a wavelength path having a node pair "i" on the virtual network "k" as the arrival/departure points and another wavelength path having a node pair "j" as the arrival/departure points. In detail, similarly to the first embodiment, a positive value is set to the regulatory matrix $W_{ij}^k$ when these two wavelength paths fall into the activation relation, while a negative value is set to the regulatory matrix $W_{ij}^k$ when these two wavelength paths fall into the inhibition relation. Also, if there is no need of promoting or restraining the setting of the latter wavelength path despite the setting of the former wavelength path, "$W_{ij}^k=0$" is set. Further, the constant $\theta^{jk}$ represents a threshold of $X_i^k(t)$ in the sigmoid function for a weighted summation by the regulatory matrix $W^k$. The third term in the sigmoid function represents the summation of wavelength paths each having arrival/departure points of a node pair "i" on all the virtual networks ($k=1, \ldots, K$). The third term inhibits the above weighted summation of a virtual network "k". In this equation, "$\beta$" is a positive constant. Similarly to the first embodiment, a function representing a term subject to the deterministic rule, which is in the brace on the right side of the fluctuation equation (9), has attractors. In addition, $\langle \alpha \rangle$ represents an activity obtained as a result of considering the multiple virtual networks as a whole. $\langle \alpha \rangle$ is determined as follows.

First of all, the activity $v_k$ as an example of the single virtual network "k" is defined as follows

[Equation 10]

$$v_k = \frac{\gamma}{1 + \exp\{\delta(u_{max}^k - \varsigma)\}}, \quad (10)$$

where "$u_{max}^k$" is an index of performance, such as a maximum utilization ratio of the virtual network "k", and "$\gamma$" is a positive constant. Then, "$v_k$" can be calculated on the basis of parameters obtained by observing the virtual network "k". Here, there is a plurality of methods of calculating "$\langle \alpha \rangle$" from "$v_k$". First, it can be expected to regard the product of the activities of all the virtual networks, that is,

[Equation 11]

$$\langle \alpha \rangle = \prod_{k=1}^{K} v_k, \quad (11)$$

as $\langle \alpha \rangle$. According to this definition, if there exists at least one virtual network having a small activity (close to zero), the activities of all the virtual networks are lowered in the same way, thereby allowing all the virtual networks to converge with a new attractor.

Besides, it can be expected to regard a weighted mean of activities $v_k$ of the respective virtual networks, that is,

[Equation 12]

$$\langle \alpha \rangle = \frac{\sum_{k=1}^{K} q_k v_k}{\sum_{k=1}^{K} q_k}, \quad (12)$$

as $\langle \alpha \rangle$. Here, "$q_k$" represents a weight to the activity $v_k$ of the virtual network "k".

According to this definition, the activity of each virtual network can be established in consideration of the other virtual networks' activities at a constant rate.

Although a same value (e.g. $q_n=1$) may be established to all of the weights $q_k$ in this definition, it means that this establishment is equivalent to the equation (11) substantially. In this case, however, there is a possibility that the activity is elevated despite an increased maximum link utilization ratio, thereby complicating the searching for a new attractor through fluctuations. In order to avoid this problem, it is possible to determine a weight $q_k$ in response to the network activity $v_k$ of its own. When the maximum link utilization ratio $u_{max}^{k}$ of its own is high while the activity $v_k$ is low, the network has to lower the activity $v_k$ of its own to promote the searching for an attractor through fluctuations with or without the activities of the other virtual networks. The weight $q_k$ satisfying this requirement has only to be a decreasing function with respect to the activity $v_k$. Therefore, a certain decreasing function "h" is provided so as to establish an equation "$q_k=h(v_k)$". Assume here that the value of "$v_k$" is within a range of [0, 1], there could be supposed an equation "$h(v_k)=1-v_k$" etc. as the function "h".

With the activity $\langle \alpha \rangle$ defined by the equation (11) or (12), even if the activity $v_k$ of a specific virtual network is improved, the activity $\langle \alpha \rangle$ does not rise as long as the activities of the other virtual networks remain lowered. The activity $\langle \alpha \rangle$ is elevated only when the activities of all the virtual networks increase uniformly. Therefore, there is no possibility that a specific virtual network is degraded in its performance due to drainage of resources, and it is possible to realize the virtual network control adaptable to environmental changes even when accommodating a plurality of virtual networks.

As mentioned above, according to the second embodiment, the competition of virtual networks for resources is conciliated by extending an attractor selection model for a single virtual network to the attractor selection on a plurality of virtual networks, thereby accomplishing an appropriate distribution of resources on a physical network. Consequently, on each virtual network, the virtual network control adaptable to environmental changes can be realized due to the attractor selection for a single virtual network. Simultaneously, even in a viewpoint of the network as a whole, the attractors' competition for resources can be avoided to realize the network control with a high stability. Moreover, as the information frequently exchanged among the virtual networks is nothing but their activities only, the burden of information exchanges is low despite the increasing of the number of virtual networks, thereby allowing a high scalability to be achieved.

3$^{rd}$. Embodiment

Premising the first embodiment, the third embodiment adheres fundamentally to the concept of the first embodiment. The feature of the third embodiment is as follows: the adaptability of the virtual networks to environmental changes is always monitored in the virtual network control device of the first embodiment. Thus, if the adaptability deteriorates, the parameters of the fluctuation equation (7) are redesigned to recover the adaptability. Therefore, the device can follow even unexpected environmental changes.

The parameters of the fluctuation equation (7), such as the elements $W_{ij}$ of the regulatory matrix W, have to be previously designed in advance at the beginning of operation of the present virtual network control device. These parameters can be calculated from various types of network conditions, such as the topology of the physical network. However, once these parameters get fixed values, an attractor easy to converge as the solution of the fluctuation equation (7) will be determined. Generally speaking, as some (about 15%) of multiple attractors are apt to form stable manifolds, the solution is capable of converging with these attractors forming the stable manifolds within a relatively short time. In the fluctuation equation (7), a plurality of attractors incorporated into a function subject to a deterministic rule is to be selected in response to environmental changes. This means that the virtual networks are possible to deal with environmental changes. However, it is difficult to predict future environmental changes and further design an optimum parameter at the beginning of the operation. If suitable parameters compatible with such environmental changes have not been designed, there is a possibility that the convergence time to an optimum attractor after the environmental changes is increased and the activities (performance) of the virtual networks are not improved sufficiently.

Therefore, the virtual network control device of the third embodiment repeats the following procedure: 1) measure the activities of the virtual networks; 2) judge whether or not environmental changes have occurred based on the measuring result of the activities of the virtual networks, and in case of the occurrence of environmental changes, judge whether the environmental applicability of the virtual networks has been degraded based on a convergence time to a control target; and 3) in case of the degradation of the environmental applicability of the virtual networks, redesign the parameters of the fluctuation equation (7). Consequently, since the parameters of the fluctuation equation (7) are learned to allow the adaptability of the virtual networks to environmental changes to be improved, it becomes possible to always maintain the performances of the virtual networks.

FIG. 8 shows a network structure of the third embodiment. This network structure is basically similar to network structure (FIG. 1) of the first embodiment mentioned above. That is, the physical network comprises physical nodes and physical links. The physical links accommodate a plurality of wavelengths by using WDM technique. The physical nodes are connected with each other through a wavelength path due to the wavelength routing. The physical network accommodates one or more virtual networks (in this case, #11 and #12).

The physical network provides the virtual networks with a topology for the virtual network composed of wavelength paths. Here, the function of designing/controlling the virtual network topologies is assumed by the virtual network control devices 10A and 10B. The virtual network control devices 10A and 10B connect the physical network with the virtual networks. The virtual network control devices 10A and 10B include means for acquiring the state information, such as the physical network topology, and the performance information, such information of the respective virtual network topologies, the link utilization ratio on the virtual networks and throughput. For environmental changes in the virtual network, however, the virtual network control devices 10A and 10B of the present embodiment retain the function of designing the topologies adaptable to the environmental changes on the basis of the above-mentioned fluctuation equation (7) to reconstruct the present virtual network topology.

Figure 9:
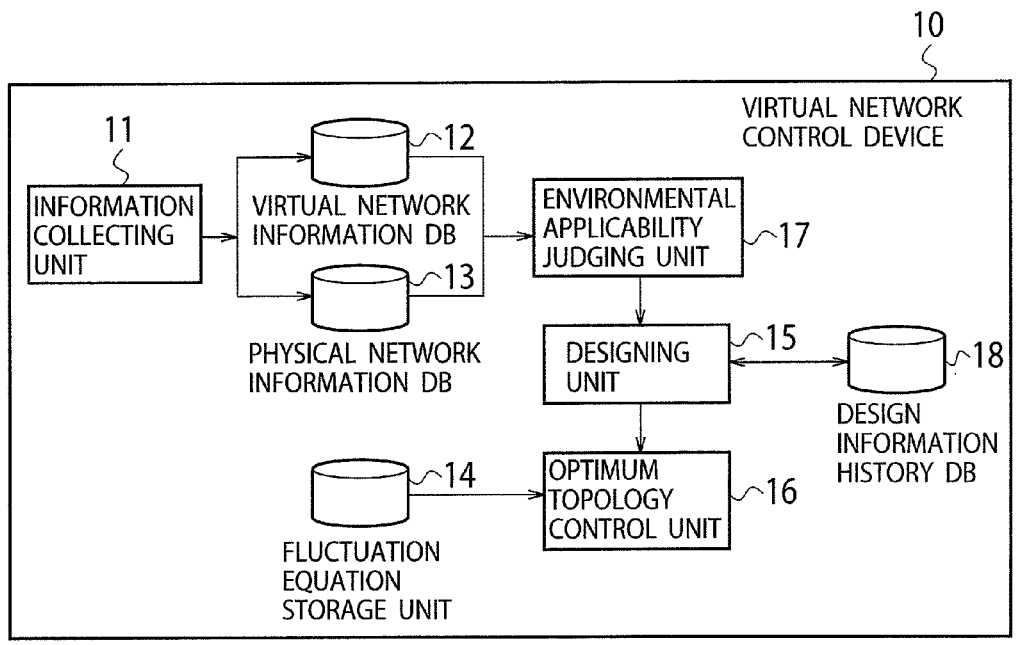
FIG. 9 is a structural view of a virtual network control device in accordance with the third embodiment.

FIG. 9 is a structural view of the virtual network control device 10 of the third embodiment. This virtual network control device 10 includes the information collecting unit 11, the virtual network information DB 12, the physical network information DB 13, the fluctuation equation storage unit 14, the designing unit 15, the optimum topology control unit 16, an environmental applicability judging unit 17, and a design information history DB 18.

The information collecting unit 11 is similar to the first embodiment in terms of measuring the virtual network information and the physical network information. Nevertheless, the information collecting unit 11 of the third embodiment is characterized by measuring the performance of the virtual network repeatedly. The virtual network information DB 12 stores the virtual network information measured by the information collecting unit 11. The physical network information DB 13 stores the physical network information measured by the information collecting unit 11. The fluctuation equation storage unit 14 memorizes the fluctuation equation (7) realizing the attractor selecting mechanism. The design information history DB 18 stores the history of input/output information used for designing the parameters of the fluctuation equation (7). The environmental applicability judging unit 17 is operable to judge whether or not environmental changes have occurred on the basis of the history of performance information (history about the maximum link utilization ratio etc.) stored in the virtual network information DB 12. When environmental changes have occurred, the environmental applicability judging unit 17 further judges whether or not the environmental applicability of the virtual networks is degraded on the basis of a convergence time to the control target. In the initial state, the designing unit 15 is operable to design the parameters of the fluctuation equation (7) in a similar method to the first embodiment, and also redesigns the parameters of the fluctuation equation (7) when the environmental applicability of the virtual networks is degraded. The optimum topology control unit 16 is operable to apply the parameters designed by the designing unit 15 to the fluctuation equation (7) and calculate the virtual network topologies based on this fluctuation equation (7) to control the virtual networks.

The constitution and operation of the virtual network control device 10 of the third embodiment will be described below.

Figure 10:
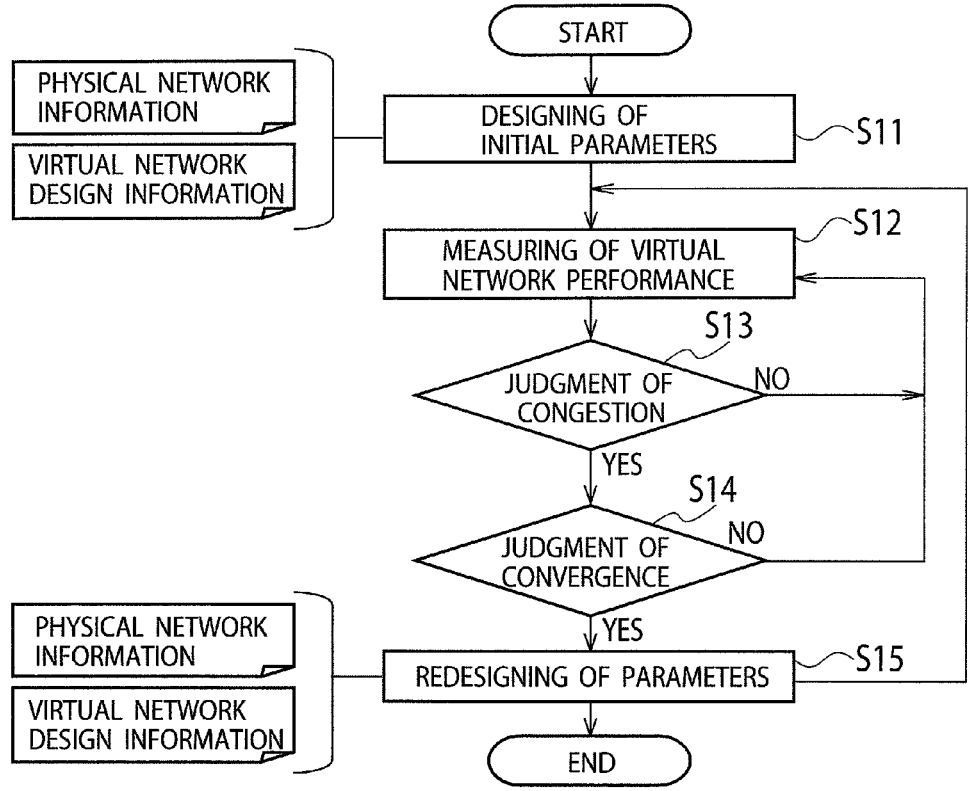
FIG. 10 is a flow chart showing the operation of the virtual network control device of FIG. 9.
Figure 11:
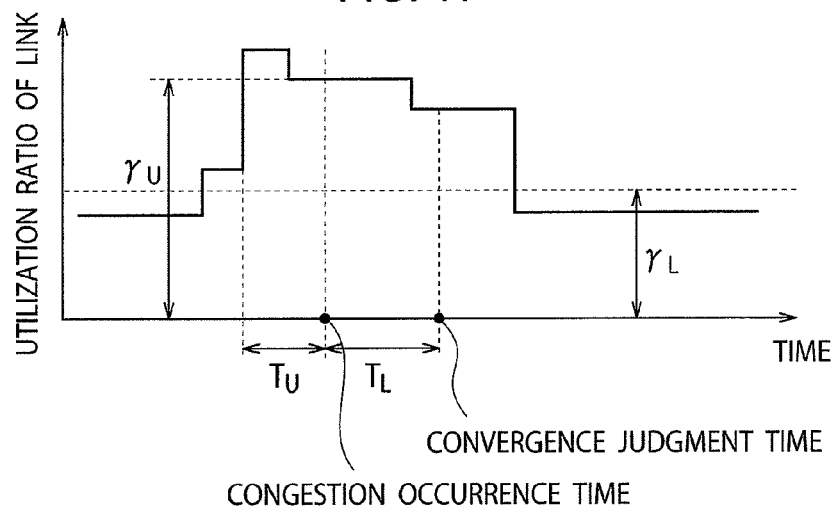
FIG. 11 is a view to explain the content of a judgment process of the third embodiment.

In the initial state, initial values for the parameters of the fluctuation equation (7) are designed from the physical network information including the physical network topology and the virtual network information (virtual network design information) including the traffic demand predictions of the virtual networks, by means of an initial designing algorithm (at step S11 of FIG. 11). As this initial designing algorithm is concerned with the first embodiment and positioned outside the main focus of the present embodiment, the detailed explanation will be eliminated When the initial values of the parameters are designed with use of the initial designing algorithm, the optimum topology control unit 16 calculates a topology of the virtual network in the initial state on the basis of fluctuation equation (7) to construct the topology on the physical network. When the operation of the virtual network is started, the information collecting unit 11 periodically measures the performance information and the virtual network topology, and the performance information and the physical network topology (at step S12 of FIG. 10). The performance information of the virtual networks defined here includes a maximum link utilization ratio in the network, a mean link utilization ratio, a throughput, delay time and so on. In this example, the maximum link utilization ratio is representative of a performance index. Instead, the throughput may be adopted as the performance index.

The virtual network control unit 10 measures the maximum link utilization ratio periodically and observes whether or not the performance of the virtual network is appropriately maintained. If the virtual network can be maintaining its adaptability to environmental changes due to the function of the optimum topology control part 16, the maximum link utilization ratio is always maintained below a preset control target value (control target value by fluctuations) $\gamma_L$. In case of regarding a link utilization ratio as the performance index, the control target value $\gamma_L$ is set within a range from 0 to 100%. If it is desired to always ensure the performance above a certain level, the control target value is set to a certain value such as a value of 50%.

From the measurement result of the maximum link utilization ratio stored in virtual network information DB12, the environmental applicability judging unit 17 judges that the environmental changes have occurred when the state having a high link utilization ratio is continuing (at step S13 of FIG. 10). In detail, as shown in FIG. 11, when the link utilization ratio continues to exceed a threshold value $\gamma_U$ over a specified period $T_U$, it is judged that the environmental changes have occurred. Although the specified period $T_U$ to judge environmental changes is determined according to the operation policy and quality level of the virtual network, it is generally employed an integral multiple of one cycle (e.g. 1 minute or 5 minutes) of the time interval required for collecting the traffic information from the nodes and controlling the nodes for the virtual network control device 10. The threshold value $\gamma_U$ is set to a value higher than the control target value $\gamma_L$ of the link utilization ratio. Further, considering a short-term fluctuation range in the link utilization ratio, the threshold value $\gamma_U$ is also set to a value that would not exceed under normal traffic fluctuations. As a target of the link utilization ratio, the threshold value $\gamma_U$ is set to a value higher than the control target value $\gamma_L$ by 10% to 20%, and also set to a value within a range that does not exceed 90% at the maximum, which is regarded as a congestion state.

Although it is judged in the present embodiment that the environmental changes have occurred if the link utilization rate exceeds the threshold value $\gamma_U$ over the fixed period $T_U$, the present invention is not limited to this embodiment only. That is, the occurrence of environmental changes may be judged when the rate of increase in the link utilization ratio exceeds a threshold value over the fixed period $T_U$.

On the judgment of the occurrence of environmental changes, the environmental applicability judging unit 17 judges whether or not the environmental applicability of the virtual network has deteriorated (at step S14 of FIG. 10). In detail, as shown in FIG. 11, the environmental applicability judging unit 17 measures the convergence time to the control target value $\gamma_L$ and judges that the environmental applicability of the virtual network has deteriorated if the link utilization ratio exceeds the control target value $\gamma_L$ over the constant period of time $T_L$. That is, if the virtual network is established in its optimal state, the optimum topology control based on the fluctuation equation (7) is performed after the constant period of time $T_L$ has passed since the occurrence of environmental changes, thereby accomplishing the attainment of a control target. Note that the constant period of time $T_L$ depends on the time interval at which the virtual network control unit 10 controls the nodes and the scale of a network. Thus, if the network scale is small and the time required for the node control is small, the above constant period of time is set to a few minutes or so. Meanwhile, if the network scale is large and the time required for the node control is large, the above constant period of time is set between 30 minutes and 1 hour or so.

If the link utilization ratio attains the control target within the specified constant period of time $T_L$, the parameters of the fluctuation equation (7) are in the optimum condition. In such a case, the virtual network control device 10 continues to observe the virtual network. On the other hand, if the link utilization ratio does not reach the control target within the specified constant period of time $T_L$, the parameters of the fluctuation equation (7) are redesigned based on the judgment that the environmental applicability of the system has deteriorated (at step S15 of FIG. 10).

Figure 12:
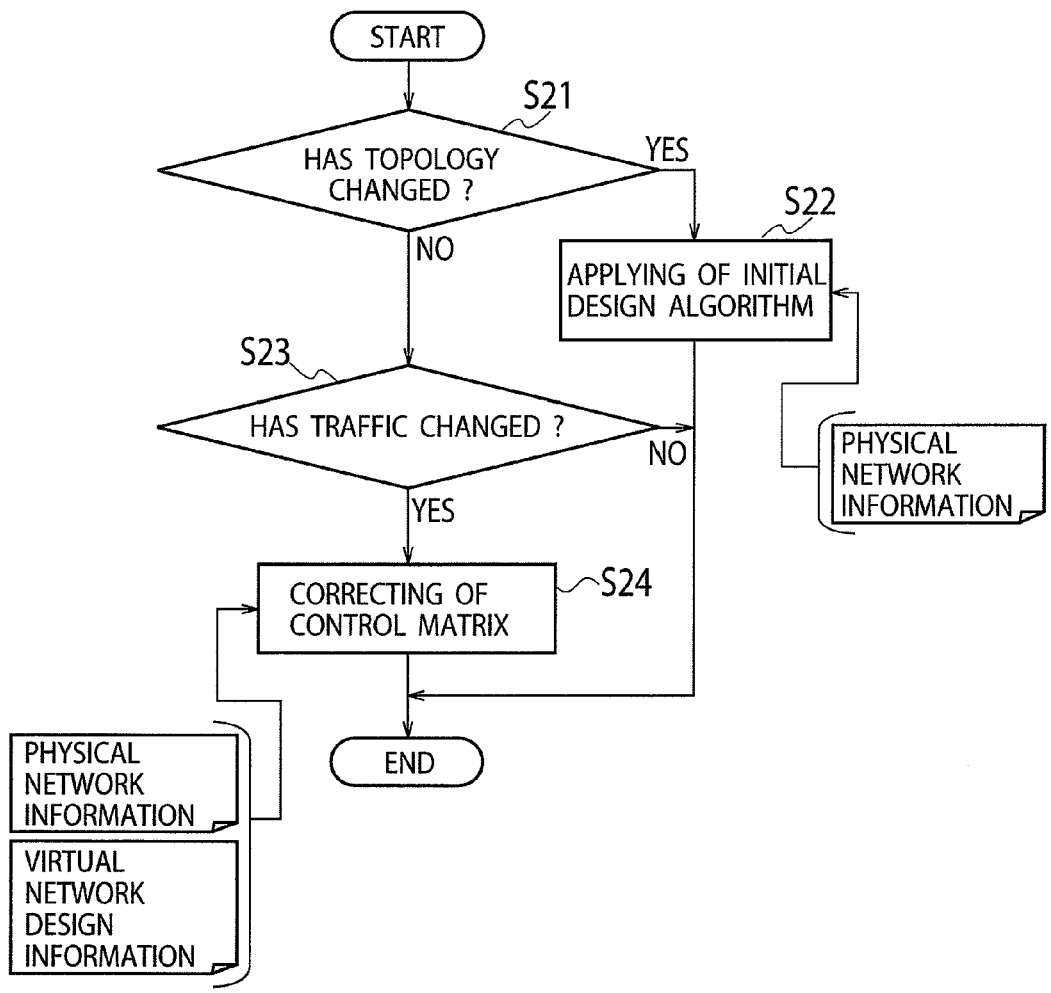
FIG. 12 is a flow chart showing the operation of the virtual network control device of FIG. 9.

FIG. 12 shows the procedure of redesigning the parameters of the fluctuation equation (7). In this redesigning procedure, the cause of deterioration in the environmental applicability is analyzed, and further the parameters in response to the analyzed cause are corrected.

That is, the design information history DB 18 stores the information (virtual network measurement information) about topologies, traffics and performances of both the virtual networks and the physical network at the previous time of designing the parameters. Therefore, the designing unit 15 compares the physical network topology stored in the design information history DB 18 with the present physical network topology stored in the physical network information DB 13 (at step S21 of FIG. 12).

If there is a difference in the topology of the physical network (Yes: at step S21 of FIG. 12), the initial design algorithm is applied to the inputted present topology information of the physical network to redesign the parameters (at step S22 of FIG. 12), and thereafter the processing is completed.

On the other hand, if there is no difference in the topology of the physical network (No: at step S21 of FIG. 12), a change in the traffic (link utilization ratio) on the physical network is evaluated (at step S23 of FIG. 12). In detail, it is executed to judge whether or not the change in the link utilization ratio is more than a constant by comparing the link utilization ratio at the previous designing, which is stored in the design information history DB 18, with the latest link utilization ratio stored in the virtual network information DB 12. Then, if the change in the link utilization ratio is less than the constant (No: at step S23 of FIG. 12), the redesigning procedure is completed. Meanwhile, if the change in the link utilization ratio is more than the constant (Yes: at step S23 of FIG. 12), the regulatory matrix W is redesigned in accordance with the following procedure (at step S24 of FIG. 12).

1. R links, each having a high link utilization ratio, is selected from virtual links on the virtual network, and the selected "R" links are stored into a high-load link list. Here, "R" is an integer equal to or more than 1, and is set within the range from 1 to a number within a range of about 10% (as an upper limit) of the total number of links.

2. The following procedure to each of the links stored in the high-load link list is applied.

(1) A pair of virtual nodes forming the arrival/departure points of a traffic accommodated in the relevant link is extracted from the route information in the virtual network information DB 12, and a list of node pairs $\{p_1, \ldots, p_i, \ldots, p_N\}$ is created. Here, "$p_i$" represents a pair of departure-side and arrival-side nodes.

(2) Two node pairs $\{p_n, p_m\}$ is selected from the list of node pairs $\{p_1, \ldots, p_i, \ldots, p_N\}$ in descending order of the number of hops, with reference to the route information in the virtual network information DB 12.

(3) The elements $W_{pn,pm}$ of a regulatory matrix W corresponding to this combination of node pairs $\{P_n, P_m\}$ is corrected in accordance with the following rules

[Equation 13]

$$W_{pn,pm} = W_{pn,pm} + a, \qquad (13)$$

[Equation 14]

$$W_{pn,pm} = W_{pn,pm} \cdot b, \qquad (14)$$

where "a" is a positive real number and "b" is an positive real number equal to or more than 1. In particular, As respective targets, a real number about 1 is set to "a" and a real number between "1" to "2" is set to "b".

On completion of the above procedure, the other parameters of the fluctuation equation (7) are redesigned on the basis of the regulatory matrix W at the time of completing the calculation. Consequently, as it becomes easy to establish a path directly connecting arrival/departure nodes of a traffic whose number of hops is especially large in the traffics passing through the high-load links, it is possible to expect that the reduction effect of load is enhanced.

As mentioned above, according to the third embodiment, since the adaptability of the virtual network to the environmental changes is always observed. When the adaptability deteriorates, the parameters of the fluctuation equation (7) realizing the attractor selecting mechanism are redesigned to allow a recovering of the adaptability. Therefore it is possible to maintain a system's followability against an occurrence of unexpected environmental changes. That is, even if the environmental changes greatly deviate from a designing assumption at the time of designing the parameters of the fluctuation equation (7), it is possible to learn the parameters of the fluctuation equation (7). Accordingly, even if the environmental changes occur beyond the scope of the assumption at the time of starting the operation of the system, it is possible to maintain the followability to the environmental changes, thereby allowing the performance of the virtual network to be maintained consistently.

REFERENCE SIGNS LIST

10, 10A, 10B . . . Virtual Network Control Devices,
11 . . . Information Collecting Unit,

23

12 ... Virtual Network Information DB,
13 ... Physical Network Information DB,
14 ... Fluctuation Equation Storage Unit,
15 ... Designing Unit,
16 ... Optimum Topology Control Unit,
17 ... Environmental Applicability Judging Unit,
18 ... Design Information History DB.

The invention claimed is:

1. A virtual network control method for adaptively controlling a topology of a virtual network formed on a physical network in response to environmental changes in the virtual network, the control method comprising:
   a step of storing a Langevin equation, as a fluctuation equation, which models the dynamics of the topology of the virtual network as a variable for controlling the number of wavelength paths on the physical network;
   a step of designing control parameters included in the fluctuation equation; and
   a step of controlling the topology of the virtual network by applying the control parameters to the fluctuation equation to change an order parameter included in the fluctuation equation when environmental changes occur in the virtual network, and by transitioning the solution of the fluctuation equation between attractors determined by the deterministic term of the fluctuation equation due to the fluctuation term of the fluctuation equation.

2. The virtual network control method of claim 1, wherein at the design step, when designing elements $W_{ij}$ of a regulatory matrix included in the deterministic term in the fluctuation equation, it is executed to calculate an inhibition relation representing a relation such that if a wavelength path is established for a node pair "i" on the physical network, a wavelength path is hard to be established for another node pair "j".

3. The virtual network control method of claim 2, wherein at the design step, the inhibition relation is calculated by the following calculation procedure:
   1. design a set of wavelength-path routes from the topology of the physical network;
   2. extract all pairs of wavelength paths sharing at least one physical link from the set of wavelength-path routes, and create a list $\{(p_1, q_1), \ldots, (p_n, q_n)\}$ of combinations of node pairs establishing the inhibition relation; and
   3. set a negative real number to respective elements $W_{pi,qi}$ of the regulatory matrix corresponding to each node-pair combination $(p_i, q_i)$ in the list $\{(p_1, q_1), \ldots, (p_n, q_n)\}$.

4. The virtual network control method of claim 1, wherein at the design step, when designing elements $W_{ij}$ of a regulatory matrix included in the deterministic term in the fluctuation equation, it is executed to calculate an activation relation representing a relation such that if a wavelength path is established for a node pair "i" on the physical network, a wavelength path is easy to be established for another node pair "j".

5. The virtual network control method of claim 4, wherein at the design step, the activation relation is calculated by the following calculation procedure:
   1. design a set of wavelength-path routes from the topology of the physical network;
   2. select a pair of wavelength paths to which the activation relation is established, in accordance with the following wavelength-path establishment policies
      (a) a wavelength path constituting a virtual link through which traffic, which is transmitted from route information of the virtual network in multi-hop, passes and another wavelength path having arrival/departure nodes of the traffic as terminal points;
      (b) wavelength paths constituting any two virtual links in virtual links through which traffic, which is trans-

24 mitted from the route information of the virtual network in multi-hop, passes; and
      (c) wavelength paths both increasing cut capacity between an arrival point and a departure point of a certain traffic;
   3. extract a combination of nodes forming the arrival/departure points of two extracted wavelength paths, and create a list $\{(p_1, q_1), \ldots, (p_n, q_n)\}$ of combinations of node pairs establishing the activation relation; and
   4. set a positive real number to respective elements $W_{pi,qi}$ of the regulatory matrix corresponding to each node-pair combination $(p_i, q_i)$ in the list $\{(p_1, q_1), \ldots, (p_n, q_n)\}$ of combinations of activation node pairs.

6. The virtual network control method of claim 4, wherein at the design step, the activation relation is calculated by the following calculation procedure:
   1. design a set of wavelength-path routes from the topology of the physical network;
   2. determine aggregation nodes from a set of physical nodes on the physical network by any one of the following methods:
      (a) specify a given number of physical nodes out of the physical nodes on the physical network, each of the specified physical nodes having the number of links accommodated therein or the summation of link capacities accommodated therein, either of which exceeds a threshold value; and
      (b) specify a given number of physical nodes so that the physical nodes are distributed on the physical network uniformly;
   3. extract, as a combination of activation node pairs, a combination of node pairs satisfying any one of the following conditions:
      (a) node pairs that any two nodes in the disaggregation nodes are established as a starting point or an ending point while a node belonging to the aggregation nodes is established as an ending point or a starting point; and
      (b) a combination of node pairs that any two nodes in the aggregation nodes are established as starting points while another node belonging to the aggregation nodes is established as an ending point;
   4. create a list $\{(p_1, p_2), \ldots, (p_n, q_n)\}$ of combinations of the extracted activation node pairs; and
   5. set a positive real number to respective elements $W_{pi,pi}$ of the regulatory matrix corresponding to each node-pair combination $(p_i, p_j)$ in the list $\{(p_1, p_2), \ldots, (p_n, p_n)\}$ of combinations of activation node pairs.

7. The virtual network control method of claim 1, wherein it is executed at the design step to: create a plurality of topologies of the virtual network highly resistant to environmental fluctuations in advance; design the regulatory matrix included in the fluctuation equation so that the created topologies are selected as the solution of the fluctuation equation; and incorporate the designed regulatory matrix as the control parameters into the fluctuation equation.

8. The virtual network control method of claim 7, wherein at the design step, the regulatory matrix as the control parameters is previously incorporated into the fluctuation equation by the following calculation procedure:
   1. based on route information $R^v$ of the virtual network observed at a certain point in time and load information U of a virtual link on the virtual network, create a plurality of cross traffics satisfying a condition $U=R^v \cdot T$ for a cross traffic T of the virtual network;
   2. create a plurality of topologies corresponding to the plurality of cross traffics created;

3. calculate a regulatory matrix for the plurality of topologies created; and
4. incorporate the calculated regulatory matrix as the parameters into the fluctuation equation.

9. The virtual network control method of claim 1, wherein when the physical network accommodates a plurality of virtual networks including the virtual network, the design step further comprises a step of adjusting order parameters mutually, which are contained in fluctuation equations modeling the dynamics of topologies of the respective virtual networks, to distribute resources of the physical network to the respective virtual networks, and
    it is executed at the control step to apply the respective order parameters to the respective fluctuation equations, thereby adaptively controlling the topologies of the plurality of virtual networks.

10. The virtual network control method of claim 9, wherein at the design step, a product of all the order parameters for the respective virtual networks is regarded as an order parameter of the plurality of virtual networks as a whole.

11. The virtual network control method of claim 9, wherein at the design step, a weighted mean of all the order parameters for the respective virtual networks is regarded as an order parameter of the plurality of virtual networks as a whole.

12. The virtual network control method of claim 1, further comprising:
    a step of measuring a performance of the virtual network repeatedly;
    a step of judging whether or not environmental changes have occurred, based on a measurement result of the performance of the virtual network, and, in case that the environmental changes have occurred, further judging whether or not an environmental applicability of the virtual network has deteriorated, based on a convergence time for a control target; and
    a step of redesigning the control parameters of the fluctuation equation when the environmental applicability of the virtual network has deteriorated,
    wherein in case that the environmental applicability of the virtual network has deteriorated, it is executed at the control step to apply the control parameters redesigned at the redesign step to the fluctuation equation, thereby controlling the topology of the virtual network.

13. The virtual network control method of claim 12, wherein at the judgment step, when a link utilization ratio in the virtual network exceeds a threshold value over a certain period of time, it is judged that environmental changes have occurred.

14. The virtual network control method of claim 12, wherein at the judgment step, when a link utilization ratio in the virtual network exceeds a control target value over a certain period of time, it is judged that the environmental applicability of the virtual network has deteriorated.

15. The virtual network control method of claim 12, wherein at the design step, the regulatory matrix contained in the fluctuation equation is redesigned by the following calculation procedure:
1. select a given number of links each having a high link utilization ratio from a set of virtual links on the virtual network, and store the given number of selected virtual links into a high-load link list; and
2. apply the following procedure to the respective virtual links stored in the high-load link list;
    (1) extract pairs of virtual nodes forming arrival/departure points of traffics accommodated in the set of virtual links from route information in a virtual network information, and create a list of node pairs $\{p_1, \ldots, p_i, \ldots, p_N\}$;
    (2) with respect to respective node pairs in the list $\{p_1, \ldots, p_i, \ldots, p_N\}$, select a combination of node pairs $\{p_n, p_m\}$ from the respective node pairs in descending order of the number of hops, with reference to the route information in the virtual network information; and
    (3) correct elements $W_{pn,pm}$ of the regulatory matrix corresponding to the combination of node pairs $\{p_n, p_m\}$ in accordance with either an condition "$W_{pn,pm}=W_{pn,pm}+a$" or "$W_{pn,pm}=W_{pn,pm}\cdot b$", where, "a" is a positive actual number and "b" is an actual number equal to or more than 1.

16. A virtual network control device for adaptively controlling a topology of a virtual network formed on a physical network in response to environmental changes in the virtual network, comprising:
    a storage unit configured to store a Langevin equation, as a fluctuation equation, which models the dynamics of the topology of the virtual network as a variable for controlling the number of wavelength paths on the physical network;
    a designing unit configured to design control parameters included in the fluctuation equation; and
    a control unit configured to control the topology of the virtual network by applying the control parameters to the fluctuation equation to change an order parameter included in the fluctuation equation when environmental changes occur in the virtual network, and by transitioning the solution of the fluctuation equation between attractors determined by a deterministic term of the fluctuation equation due to a fluctuation term of the fluctuation equation.

\* \* \* \* \*